(12) United States Patent
Kumar et al.

(10) Patent No.: US 10,990,349 B2
(45) Date of Patent: Apr. 27, 2021

(54) WIRELESS AUDIO SPLITTER

(71) Applicant: Apple Inc., Cupertino, CA (US)

(72) Inventors: Aarti Kumar, Menlo Park, CA (US); Ahmad Rahmati, Mountain View, CA (US); Natalia A. Fornshell, Campbell, CA (US); Sriram Hariharan, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/141,776

(22) Filed: Sep. 25, 2018

(65) Prior Publication Data

US 2019/0102143 A1    Apr. 4, 2019

Related U.S. Application Data

(60) Provisional application No. 62/566,208, filed on Sep. 29, 2017.

(51) Int. Cl.
*H04R 3/12* (2006.01)
*H04L 5/00* (2006.01)
*G06F 3/16* (2006.01)

(52) U.S. Cl.
CPC ............ *G06F 3/165* (2013.01); *H04L 5/0055* (2013.01); *H04R 3/12* (2013.01); *H04R 2420/07* (2013.01)

(58) Field of Classification Search
CPC ... H04W 4/008; H04W 72/085; H04W 72/10; H04W 72/0413; H04R 5/04; H04R 3/12; H04R 2420/07; G06F 3/165; H04L 5/0055

USPC .................................................. 381/77–80
See application file for complete search history.

(56) References Cited

U.S. PATENT DOCUMENTS

| | | | |
|---|---|---|---|
| 6,970,940 B1 | 11/2005 | Vogel et al. | |
| 7,827,286 B1 | 11/2010 | Deflaux et al. | |
| 8,054,987 B2 | 11/2011 | Seydoux | |
| 8,159,990 B2* | 4/2012 | Haartsen | H04L 1/189 370/315 |
| 8,224,247 B2 | 7/2012 | Kidron et al. | |
| 8,433,243 B2 | 4/2013 | Sharma | |
| 2006/0116075 A1 | 6/2006 | Gallo | |
| 2010/0232618 A1* | 9/2010 | Haartsen | H04L 1/0003 381/80 |
| 2011/0090837 A1* | 4/2011 | Duchscher | H04L 1/0057 370/312 |
| 2012/0058727 A1* | 3/2012 | Cook | H04R 3/00 455/41.3 |
| 2014/0219193 A1 | 8/2014 | Linde et al. | |
| 2015/0118953 A1 | 4/2015 | Davari | |
| 2016/0191181 A1 | 6/2016 | Bailey | |
| 2016/0286337 A1 | 9/2016 | Thekkedathu Sivaraman et al. | |

(Continued)

*Primary Examiner* — Disler Paul
(74) *Attorney, Agent, or Firm* — Womble Bond Dickinson (US) LLP

(57) ABSTRACT

A host device communicating with a plurality of accessory devices transmits audio data packets via a broadcast channel to the plurality of accessory devices. When one of the plurality of accessory devices determines an audio data packet has not been received, the accessory device sends a negative-acknowledgement signal (NACK) via a unicast channel. The NACK indicates that the at least one of the accessory devices did not receive at least one audio data packet. The host device retransmits the at least one audio data packet indicated as not being received via the broadcast channel to the plurality of accessory devices. Other aspects are also described and claimed.

14 Claims, 7 Drawing Sheets

(56) References Cited

U.S. PATENT DOCUMENTS

| | | | |
|---|---|---|---|
| 2017/0026992 A1* | 1/2017 | Jiang | H04L 5/1469 |
| 2017/0251469 A1* | 8/2017 | Lee | H04L 1/16 |
| 2017/0325277 A1* | 11/2017 | Fujishiro | H04W 4/06 |
| 2018/0219646 A1* | 8/2018 | Del Carpio Vega | H04W 48/12 |
| 2019/0109678 A1* | 4/2019 | Rollet | H04N 19/114 |

* cited by examiner

WIRELESS AUDIO SPLITTER

This nonprovisional patent application claims the benefit of the earlier filing date of U.S. provisional application No. 62/566,208 filed Sep. 29, 2017.

FIELD

One aspect of the disclosure herein relates to audio data streaming from a host device to multiple accessory devices.

BACKGROUND

Many electronic devices may make use of different communication technologies. For example, electronic devices may communicate using Bluetooth technology. A Bluetooth host device may communicate with multiple Bluetooth devices. The Bluetooth host device may stream an audio stream to each of the Bluetooth devices. Current Bluetooth technology provides for sending separate audio streams on separate channels to each of the multiple Bluetooth devices. Sending an individual audio stream to each receiving device can create an encumbering overhead on the host device which multiplies as the number of receiving devices is increased.

BRIEF DESCRIPTION OF THE DRAWINGS

The aspects herein are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects are now explained with reference to the appended drawings. Whenever aspects are not explicitly defined, the scope of the aspects described herein are not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description.

Generally, the aspects disclosed herein aim to provide audio streaming from a host device to multiple accessory devices by broadcasting the audio stream from the host device simultaneously to the multiple accessory devices and receiving feedback from each of the multiple receiving devices via an individual link (e.g., unicast). In particular, according to one aspect, the host device, communicating with multiple accessory devices, transmits audio data packets via a broadcast channel to the multiple accessory devices. Each of the accessory devices determines whether one of the audio data packets among a sequence of data packets has not been received. If one of the accessory devices determines that one of the audio data packets of the sequence has not been received, the accessory device sends a negative-acknowledgement signal (NACK) to the host device via a unicast channel. The NACK indicates that the accessory device did not receive one or more audio data packets. After receiving the NACK, the host device retransmits the audio data packet or packets indicated as not being received to the multiple accessory devices via the broadcast channel.

In one aspect, the NACK may include one or more conditions of an RF channel used to transmit the audio data packets. In one instance, depending on the one or more conditions of the RF channel included in the NACK, the host device may vary a size of the audio data packets transmitted to the multiple accessory devices via the broadcast channel. In another instance, depending on the one or more conditions of the RF channel included in the NACK, the host device may retransmit the audio data packet or packets indicated as not being received with a lower bit rate.

By virtue of the aspects discussed herein, a wireless splitter mode for audio streaming is enabled allowing two or more wireless audio accessories to listen to the same audio content simultaneously. The aspects discussed herein further provide the advantageous effect of enabling streaming to multiple devices at the same time without encumbering overhead on the host device of sending the audio data to multiple devices.

Figure 1:
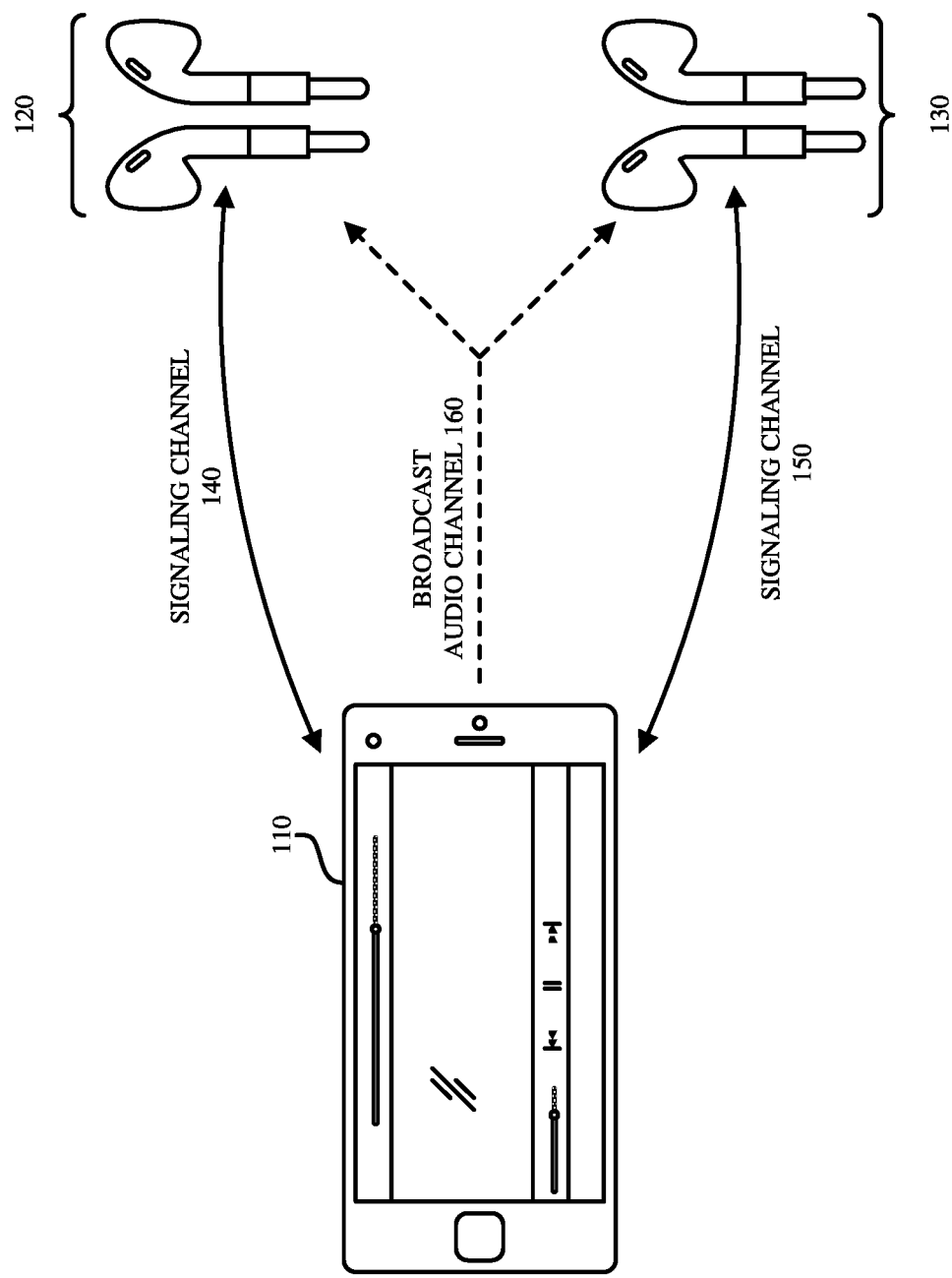
FIG. 1 illustrates a host device communicating with multiple accessory devices, for explaining audio data transmission, according to an example aspect.

FIG. 1 is a representational view of a host device 110, a first accessory device 120 and a second accessory device 130, in which systems and methods for audio streaming may be implemented according to an example aspect. Audio streaming may include user content program audio, such as music, podcasts, movie audio, far end user telephony transmission, etc. As illustrated in FIG. 1, the host device 110 broadcasts or multicasts audio streaming via a broadcast audio channel 160, and the first accessory device 120 and the second accessory device 130 receive the audio streaming via the broadcast audio channel 160. The first accessory device 120 and the second accessory device 130 communicate with the host device 110 via signaling channels 140 and 150, respectively. The audio streaming between the host device 110 and the first accessory device 120 and the second accessory device 130, and the communication between the first accessory device 120 and/or the second accessory device 130 are described in greater detail below in connection with FIGS. 2-7.

In one aspect, the host device 110 may be capable of communication via Bluetooth. While the host device 110 is shown in FIG. 1 as a smartphone, the host device 110 may also be referred to as a wireless device, wireless communication device, a mobile device, mobile station, subscriber station, client, client station, user equipment (UE), remote station, access terminal, mobile terminal, terminal, user terminal, subscriber unit, etc. Examples of the host device 110 may include laptop or desktop computers, cellular phones, smart phones, wireless modems, e-readers, tablet devices, gaming systems, etc. Some of these devices may operate in accordance with one or more industry standards in addition to Bluetooth (e.g., WiFi and/or one or more cellular standards).

As shown in FIG. 1, the first and second accessory devices 120, 130 may be, for example, devices capable of receiving an audio stream from the host device 110 via Bluetooth. Furthermore, the first and second accessory devices 120, 130 may be capable of playing the received audio stream. For example, the first accessory device 120 or the second accessory device 130 may be a Bluetooth-enabled headset, headphone, speakers, home audio system, or audio system in a vehicle.

While two (2) accessory devices (first and second accessory devices 120, 130) are shown in FIG. 1 as receiving audio streaming through broadcast audio channel 160, any number of devices may simultaneously receive the audio streaming through broadcast audio channel 160. For example, three (3) to six (6) accessory devices may simultaneously receive the audio streaming through broadcast audio channel 160. Of course, the numbers of accessory devices provided is merely an example and can be extended beyond six devices, and the aspects herein are not limited by such example.

The host device 110 may also include a Bluetooth transceiver (shown in FIG. 8 described below) that may establish links with one or more accessory devices. Bluetooth is a packet-based protocol with a master-slave structure. Bluetooth operates in the Industrial, Scientific and Medical (ISM) 2.4 GHz short-range radio frequency band (e.g., 2400-2483.5 MHz). Bluetooth uses a radio technology called frequency-hopping spread spectrum in which transmitted data is divided into packets and each packet is transmitted on a designated Bluetooth frequency.

Communications in a Bluetooth network may be achieved based on a master polled system. The master polled system may utilize time-division duplexing (TDD) in which a Bluetooth host device may send a packet to a Bluetooth device. In one implementation, the Bluetooth host device may be a master device and the Bluetooth device may be a slave device. In a master polled system, the Bluetooth host device sending the packet gives the slave wireless device the ability to transmit back.

In Bluetooth, one master device may communicate with one or more slave devices. The master device may also be referred to simply as "master" and the slave device may also be referred to as "slave." The network of master device and slave devices may be referred to as a piconet. The Bluetooth devices (e.g., master and slave devices) may switch roles, by agreement.

In one aspect, an active slave broadcast logical transport is used to transport L2CAP user traffic to all devices in the piconet that are currently connected to the piconet physical channel that is used by the ASB. L2CAP is used within the Bluetooth protocol stack. It passes packets to either the Host Controller Interface (HCI) or on a hostless system, directly to the ACL/ASB/PSB link. L2CAP's functions include: Transporting data for higher layer protocols, including multiplexing multiple applications over a single link. See Bluetooth Specification Core Version 4.2 (adopted Dec. 2, 2014).

In ASB, there is no acknowledgement protocol and the traffic is uni-directional from the piconet master to the slaves. To improve reliability somewhat each packet is transmitted a number of times. An identical sequence number is used to assist with filtering retransmissions at the slave device. The ASB logical transport is identified by the reserved, all-zero, LT ADDR. Packets on the ASB logical transport may be sent by the master at any time.

The host device 110 may stream the audio stream using a Bluetooth profile. In order to use Bluetooth technology, a device (e.g., host device 110 and first and second accessory devices 120, 130) may be compatible with a subset of Bluetooth profiles necessary to use desired services. A Bluetooth profile is a specification regarding an aspect of Bluetooth-based wireless communication between devices. Therefore, the way a device uses Bluetooth technology depends on its profile capabilities. The profiles provide standards that manufacturers follow to allow devices to use Bluetooth in an intended manner.

In one implementation, the host device 110 may stream the audio stream using an advanced audio distribution profile (A2DP). The A2DP profile may define how multimedia audio can be streamed from the host device 102 to the accessory devices 104 over a Bluetooth channel 118. Audio/Video Remote Control Profile (AVRCP) can be used in conjunction with A2DP for remote control on devices (e.g., first and second accessory devices 120, 130) such as headphones, car audio systems, or stand-alone speaker units. Each A2DP service is designed to uni-directionally transfer an audio stream in up to 2 channel stereo, either to or from the Bluetooth host.

In an example where an audio stream is music, two different users (one using the first accessory device 120 and the other using the second accessory device 130) may simultaneously listen to the music streamed from the host device 110.

In some aspects, the host device 110 may stream the same media content to up to three headphones simultaneously. The host device 110 may manage media controls (e.g., play, pause) per stream, and manage audio controls (e.g., volume, mute) per each device. A user of the host device may be able to select multiple devices from a control center and play media on those devices. The user may also be able to bring another accessory device, for example, another set of earphones near the host device 110 and select share.

In the configuration shown in FIG. 1, the wireless links provided by the broadcast audio channel 160 and the signaling channels 140 and 150, enable audio streaming to multiple devices while managing a reliable link and/or quality of service. In the configuration shown in FIG. 1, stream session management may be included in the host device 110 for functionality to start/end a sharing session and HPUI definition on audio/system behavior. The host device 110 may also include a device configuration for connection/disconnection management and audio signaling management. Each of the first and second accessory devices 120, 130 may be provided with media controls to: (1) manage media controls from both (multiple) devices, (2) manage volume control per device, independent volume control, and (3) UI behavior for volume control.

Having the arrangement of wireless links in which the host device 110 broadcasts audio data packets to the accessory devices 120, 130 and the accessory devices 120, 130 provide feedback and control information, allows (1)

streaming audio content to 3 or more devices, (2) a reliable audio link—with no to little packet loss, and (3) limited increase in link bandwidth requirement. This configuration using a broadcast streaming mode may include: (1) same audio packets to be received by one or more receivers, (2) avoiding sending audio packets twice or [n] for 2 or n receivers, (3) limiting [n] to a number of allowed connections which can be, for example, six, and (4) using active Broadcast slave mode. The control of extending the broadcast to additional receivers may be limited to one of the accessory devices.

In one configuration, the host device 110 may include a cellular transceiver (not shown) that may communicate with a cellular network. Communications in a mobile wireless system (e.g., a multiple-access system) may be achieved through transmissions over a wireless link. The foregoing may provide the host device 110 with call management to identify/create primary device identity and use the primary device for call/Siri.

Figure 2:
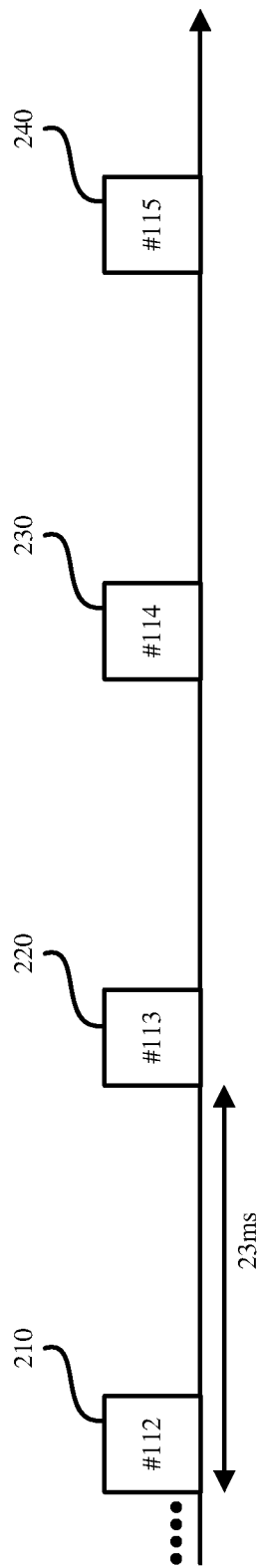
FIG. 2 illustrates a block diagram for explaining an audio data transmission sequence according to an example aspect.

Turning to FIG. 2, FIG. 2 illustrates an example sequence of audio data blocks in an audio streaming being broadcast by host device 110 to the first and second accessory devices 120, 130 over broadcast audio channel 160. As shown in FIG. 2, audio data blocks 210, 220, 230, and 240 are provided in a sequence order of #112, #113, #114, and #115. Each audio data block is provided in broadcast in a sequence at a time period, for example, of 23 ms between each audio data block. Persons skilled in the art will appreciate that the time period can be other amounts of time and is established upon connecting the host device 110 and the accessory devices (e.g., first and second accessory devices 120, 130). The time period may be consistent between audio data blocks throughout the broadcast of the audio stream. Example types of the broadcasted packets include 2DH5/3DH5 packets. The packet type for broadcast transmission is enabled at the host device 110. Persons skilled in the art will appreciate that other types of supported data packets may be broadcast. At the accessory device side, the first and second accessory devices 120, 130 read the broadcast signal as reliable packets and send it to the host device 110. The Bluetooth stack can be changed to receive audio packets over the broadcast channel.

Figure 3:
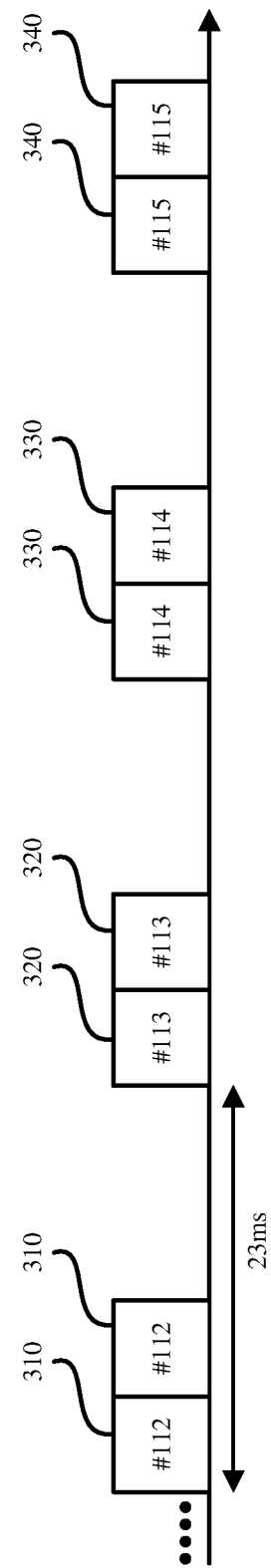
FIG. 3 illustrates a block diagram for explaining an audio data transmission sequence according to an example aspect.
Figure 4:
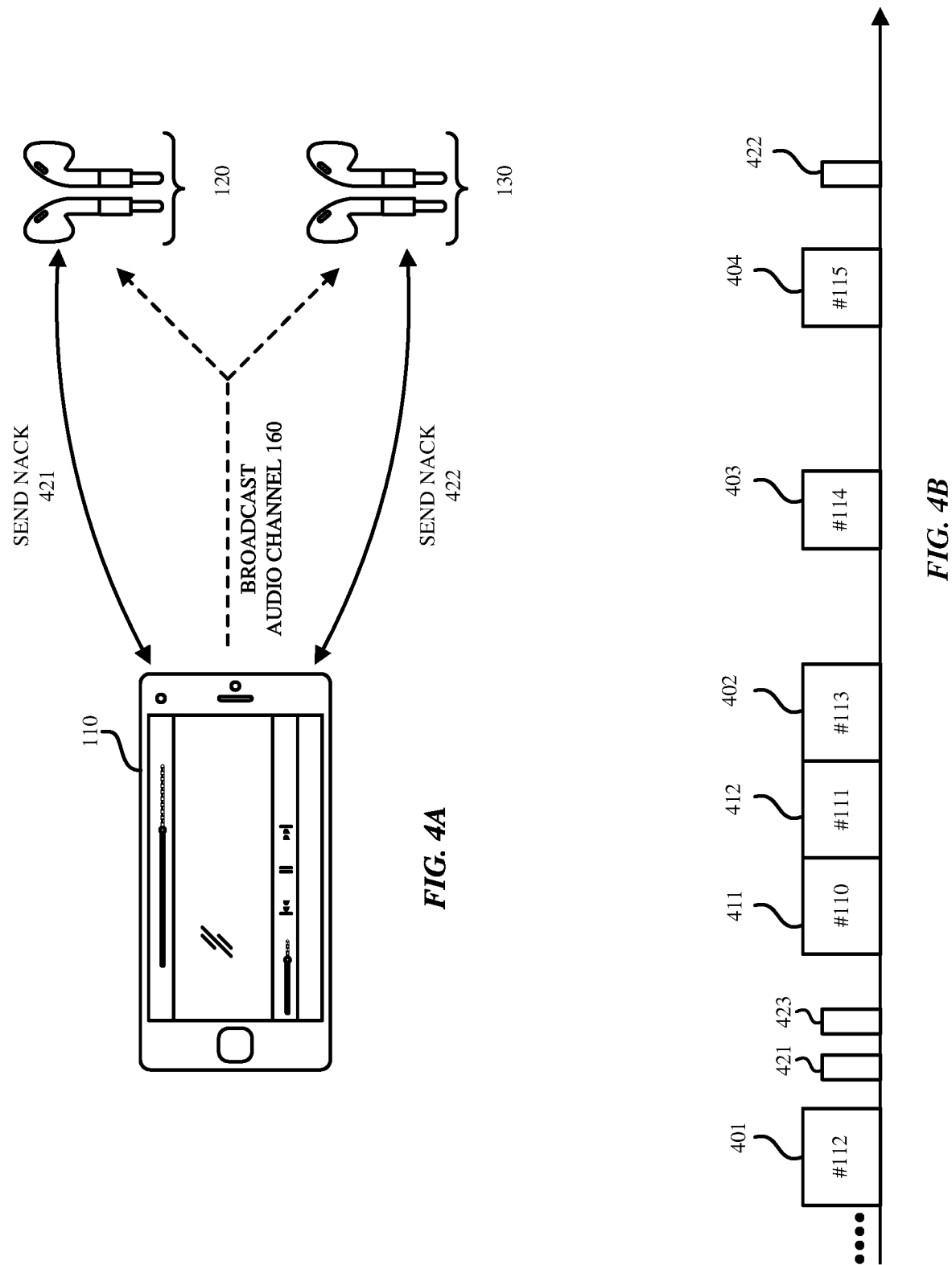
FIG. 4A illustrates a host device communicating with multiple accessory devices, for explaining audio data transmission, according to an example aspect.
FIG. 4B illustrates a block diagram for explaining an audio data transmission sequence according to an example aspect.

FIG. 3 illustrates another example sequence of audio data blocks in an audio stream being broadcast by host device 110 to the first and second accessory devices 120, 130 over broadcast audio channel 160. As shown in FIG. 3, each of the audio data packets of the audio stream may be transmitted multiple times at each time period to increase reliability of each of the accessory devices receiving the data packets. For example, audio data packets 310 having sequence #112 may be transmitted twice, audio data packets 320 having sequence #113 may be transmitted twice, audio data packets 330 having sequence #114 may be transmitted twice, and audio data packets 340 having sequence #115 may be transmitted twice. Persons skilled in the art will appreciate that the foregoing numbers of transmitted data packets for each sequence number are merely examples, and other numbers of transmitted data packets for each sequence number may be used. In this regard, the host device 110 may have the capability to set repeatability count per packet.

FIG. 4A illustrates an example of the host device 110 broadcasting an audio stream via the broadcast audio channel 160 to first and second accessory devices 120, 130, and the first and second accessory devices 120, 130 providing control feedback by way of a negative-acknowledgement signal (NACK) (e.g, NACKS 421 and 422). FIG. 4B illustrates an example audio stream including data packets (e.g., audio data packets 401-404 including sequence # s 112-115) being streamed from the host device 110 to the first and second accessory devices 120, 130 in accordance with a configuration, for example, as shown in FIG. 4A.

In the configuration shown in FIG. 4A, the host device 110 sends audio data packets as a sent broadcast packet over the air, for example, at around 600-700 bytes, using 2DH5/3DH5 packets. The configuration can use A2DP signal channelings to get information on a number of packets not received. This information can be used to retransmit missed packets.

In particular, the NACK or NACKS may be sent through a sniff link, where the sniff intervals are agreed upon by the host device 110 and the first and second accessory devices 120, 130. The NACK may indicate a specific sequence # of a data packet that has not been received. The NACK may also include one or more conditions of the RF channel broadcasting the audio data packets such as bursts of interference, bandwidth limitations or noise in the channel. The conditions may indicate how far away an accessory device is from the host device. The NACK may be an out-of-band NACK, and transferred on a unicast channel that is separate from the main broadcast channel.

Figure 6:
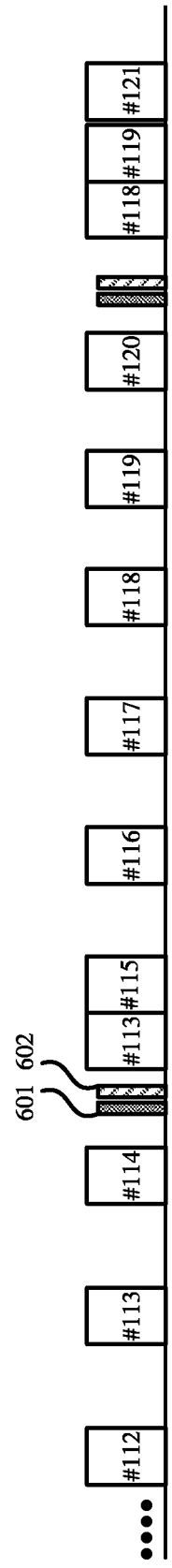
FIG. 6 illustrates a block diagram for explaining an audio data transmission sequence according to an example aspect.

In the example shown in FIG. 4B, the first accessory device 120 has detected that audio data packets having serial # s of 110 and 111 have not been received and sends a NACK to the host device 110 for each of these data packets during a sniff interval indicated at 421. The third accessory device (not shown) also detects that an audio data packet having a serial # of 111 has not been received and sends a NACK to the host device 110 during a sniff interval indicated at 423. Based on receipt of the NACKS, the host device 110 retransmits packets for audio packets having serial # s of 110 and 111 (indicated as 411 and 412, respectively) at the next transmission interval and transmits audio data packet having a serial # of 113 (indicated as 402). It is noted that the retransmitted packets are broadcast to all of the accessory devices regardless of which accessory device sent the NACK. This ensures that all of the accessory devices receive the retransmission of data packets which have been indicated as not being received, even in the case that accessory device misses that a data packet has not been received. Also, if the host device 110 receives more than one NACK for the same audio data packet, then the host device 110 may retransmit one instance of the audio data packet. For example, as shown in FIG. 6, at reference 601 accessory device 120 sends a NACK on a sniff or LE link indicating that packet #113 has not been received, and at reference 602 accessory device 130 sends a NACK on a sniff or LE link also indicating that packet #113 has not been received. As shown in FIG. 6, packet #113 is retransmitted once.

Furthermore, in the example shown in FIG. 4B, the second accessory device 130 detects that audio data packet #114 has not been received after receiving audio data packet #115 (404), and sends a NACK during a sniff interval indicated at 422. The host device 110 upon receipt of the NACK will retransmit the audio data packet #114 with transmission of audio data packet #116 (not shown).

By way of background, receiving devices in known configurations typically sends an acknowledgment (ACK) to the host device for every audio data packet received by the receiving device. If the host device does not receive an ACK from a receiving device for a particular audio data packet, then the host device retransmits the audio data packet to the receiving device. This method of retransmission can place extra burden on the receiving devices, and can compound the encumbering overhead placed on the host device. By virtue of the aspects herein, since the accessory devices are only sending NACKS when a data packet is not received, the overhead on the host device can be greatly reduced.

Figure 7:
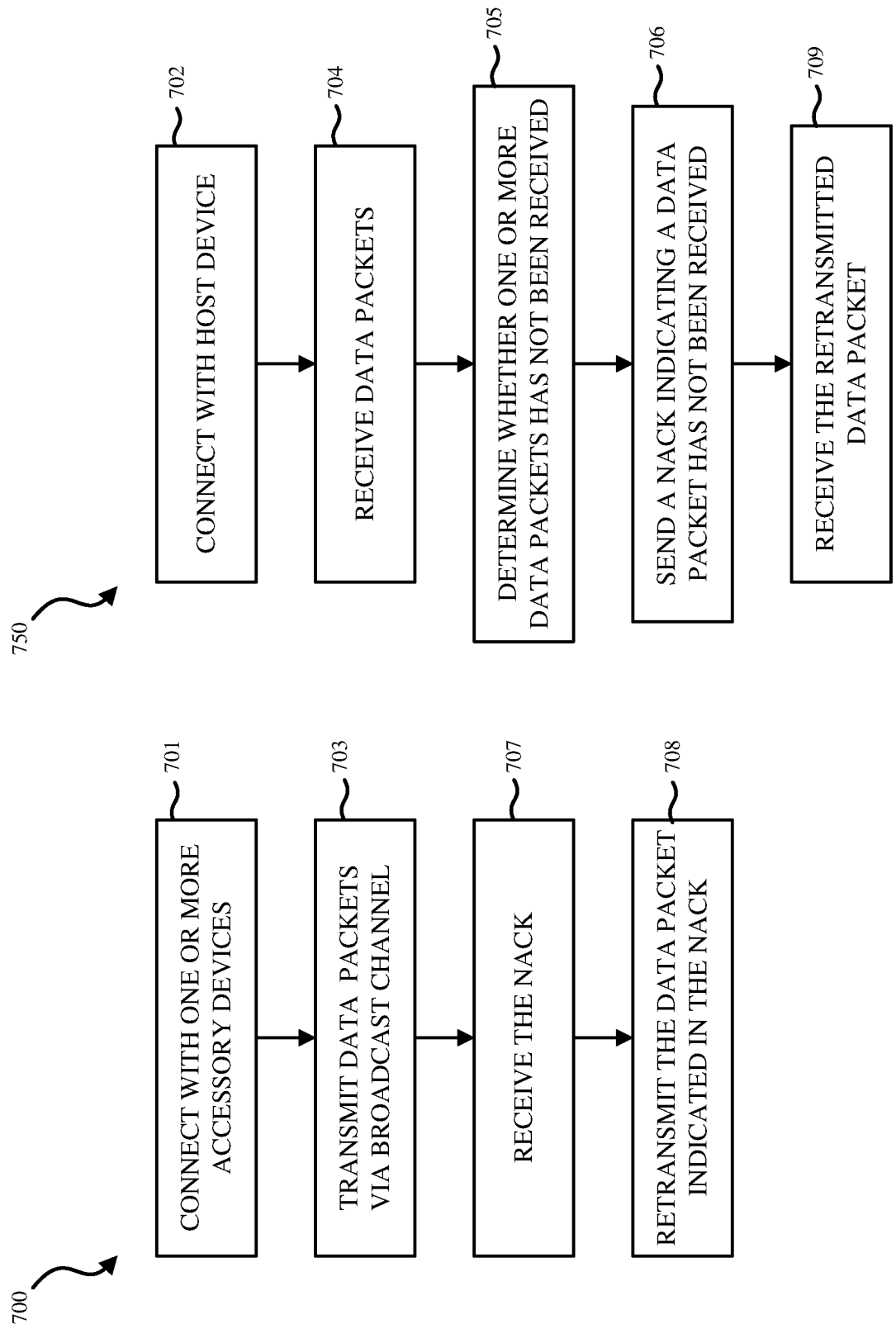
FIG. 7 illustrates a flow diagram for explaining a process of audio data transmission according to an example aspect.

FIG. 7 illustrates a flow diagram for explaining a process of transmitting an audio stream from a host device (e.g., host device 110 of FIG. 1) to multiple accessory devices (e.g., first and second audio data packets 120, 130 of FIG. 1), according to an example aspect. In this regard, the following aspects may be described as a process 700 and a process 750, which are usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc. Processes 700 and 750 may be performed by processing logic that includes hardware (e.g. circuitry, dedicated logic, etc.), software (e.g., embodied on a non-transitory computer readable medium), or a combination thereof.

In one example aspect, process 700 is executed by host device 110 and process 750 is executed by first and second accessory devices 120, 130. In this regard, although processes 700 and 750 of FIG. 7 are described in connection with a Bluetooth configuration illustrated in FIG. 1, it should be understood that these processes may be applied to other wireless link configurations such as WIFI (IEEE 802.11).

Referring to FIG. 7, at blocks 701 and 702 the host device 110 and the first and second accessory devices 120, 130 establish a connection in accordance with the Bluetooth specification. Here, a period of time between transmission of audio data packets (e.g., audio data packets shown in FIGS. 2-6), for example, 23 ms is established. During establishing of the connections between the host device 110 and the first and second accessory devices 120, 130, encryption keys exchanged. As a result, the host device 110 is set up to broadcast data packets to the first and second accessory devices 120, 130, and each of the first and second accessory devices 120, 130 is set up to provide control information via a unicast channel to the host device 110. Any device having the encryption key may receive the multicast or broadcast.

At block 703, the host device 110 transmits audio data packets (e.g., audio data packets 210-240 of FIG. 2) via a broadcast channel (e.g., broadcast audio channel 160 of FIG. 1) to the first and second accessory devices 120, 130. The audio data packets are sent in sequential order (e.g., #112-#115, etc.) every period of the established time period. The sequential order may be identical for each of the first and second accessory devices 120, 130.

At block 704, each of the first and second accessory devices 120, 130 receives the audio data packets transmitted from the host device via the broadcast channel. At block 705, each of the first and second accessory devices 120, 130 determines whether one or more of the audio data packets in the sequence of audio data packets has not been received. This determination may be performed by monitoring the data packets received and filtering the received data packets to the A2DP or application layer of each accessory device. The determination can be made based on a timeout of packets received or based on a sequence # missing in the packets received or both. For example, the accessory device may set a time period, for example, of every third sequence number (e.g., 23 ms×3). If an audio data packet has not been received within this set time period, then the accessory may determine that an audio data packet was not received. In another example, the accessory device may check the count of packets received in a sequence of packets. If all of the expected packets have arrived at the accessory device, then the accessory device does nothing. If the accessory device checks the count of packets and one or more of the data packets is not included in the count, then the accessory device may create a bitmap of sequence numbers of data packets that have not been received.

At block 706, one of the accessory devices (e.g., the first accessory device 120 or the second accessory device 130 or both) sends a negative-acknowledgement signal (NACK) to the host device via a unicast channel based on the determination made in block 705. The NACK indicates that at least one audio data packet has not been received by the accessory device, and specifies the audio data packet that has not been received. The NACK may also include one or more conditions of an RF channel used to transmit the audio data packets. For example, the conditions may include noise on the channel, interference, max usage of network bandwidth, latency, etc.

At block 707, the host device 110 receives the negative-acknowledgement signal (NACK) sent from the accessory device via the unicast channel. The NACK indicates that the accessory devices did not receive at least one audio data packet, and specifies to the host device 110 which audio data packet has not been received by the accessory device.

Based on the NACK received at block 707, the host device 110 retransmits the specified audio data packet indicated as not being received via the broadcast channel to the first and second accessory devices 120, 130 (708). In one aspect, the host device 110 may vary a size of the transmitted audio data packets based on the one or more conditions of the RF channel included in the received NACK. For example, if the conditions of the RF channel indicate a good connection, then the host device may transmit larger data packets. On other hand, if the conditions indicate a bad connection, then the host device may transmit smaller data packet that are more likely to be received. In another aspect, the host device 110 may retransmit the audio data packet with a lower bit rate based on the one or more conditions of the RF channel included in the received NACK. For example, the host device 110 may change the quality of the data packet from a high quality (e.g., 256 Kb/s) to a lower quality (e.g., 128 Kb/s) for retransmission.

At block 709, the first and second accessory devices 120, 130 receive the indicated at least one audio packet retransmitted by the host device 110 via the broadcast channel.

In other aspects, mechanisms and solutions are provided to allow/enhance multi-stream and/or multi-cast transmissions for A2DP audio playback to multiple playback devices (e.g., headphones) and other applications. In one aspect, more resilient Bluetooth encodings and packet types may be used, including forced and/or adaptive usage. In another aspect, data rate requirements may be reduced, including fitting one or more audio frames into Bluetooth frames of different types, potentially shorter ones (e.g., 3 instead of 5 slots). This can be adaptive depending on device, link, and system characteristics and conditions. In yet another aspect, Bluetooth transports and protocols such as Connectionless Slave Broadcast and Active Slave Broadcast can be used for part or all of the data transmissions. In a further aspect, a separate channel (control channel) for part of transmission to and from the playback device (e.g., for AVRCP) can be used. This can be point-to-point or multicast, and can be over Bluetooth Classic (Active or Slave mode) or Bluetooth Low Energy (LE). In yet a further aspect, no retransmissions, a fixed number of retransmissions, or retransmissions can be used based on an ACK and/or NACK mechanism. Each playback device can potentially transmit their ACKs/

NACKS using a non-standard (e.g., in-band or out-of-band) mechanism (block or individual) as described below in order to reduce airtime and/or allow a larger number of simultaneous playback devices: (a) NULL packets, (b) ID packets, (c) LE packets, (d) Over a separate connection (e.g., Block ACKs or NACKs over a Sniff mode control channel or LE channel), etc.

Figure 5:
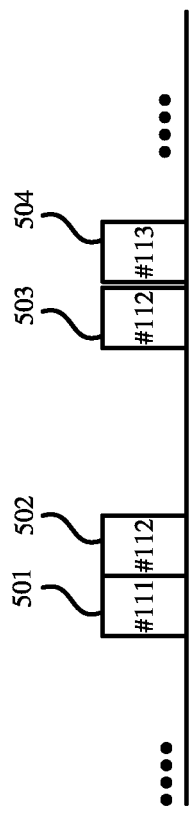
FIG. 5 illustrates a block diagram for explaining an audio data transmission sequence according to an example aspect.

In an aspect, retransmitted frames can be one or both of delayed and staggered in order to improve the odds of successful reception, in particular for a fixed-number-of-retransmissions setup. This can reduce the impact of transient wide-band interferers. As on example, as shown in FIG. 5, the transmission of packets #111-113 is performed in a staggered manner. In particular, packet 501 (#111) is transmitted with packet 502 (#112). Then, packet 503 (#112) is transmitted again with packet 504 (#113). Moreover, measurements have shown that the probability of a successful frame transfer is significantly less immediately after a failed transfer. For example, for a single-retransmit scenario where Rxx is a retransmission of xx, and xx is the A2DP sequence number, frames 11, R11, 12, R12, 13, R13, . . . should be transmitted as 11, R10, 12, R11, 13, R12, 14, R13 (delay=1) or 11, R9, 12, R10, 13, R11, (delay=2) or 11, R8, 12, R9, 13, R10, (delay=3). With a larger delay, the retransmission can become more independent of the original transmission, improving the probability of success.

In a further aspect, retransmitted frames can be delayed and/or staggered in order to improve coexistence with other radios (e.g., WiFi), in particular for a ACK/NACK based retransmission setup. This can reduce the impact of interferers on airtime usage of Bluetooth. It is noted that many of these ideas can be applied beyond A2DP and can be applied to other Bluetooth applications, audio and non-audio alike. Further, these ideas may potentially be applied in wireless and wired technologies beyond Bluetooth.

Figure 8:
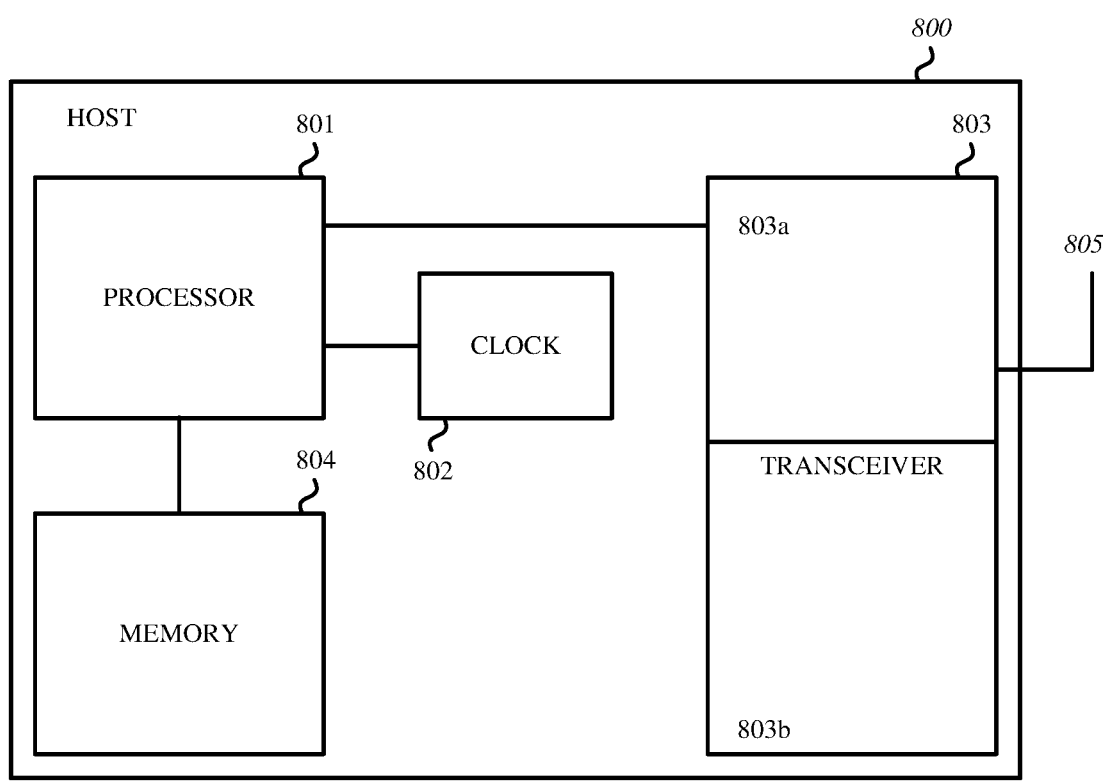
FIG. 8 illustrates a representational view of a host device according to an example aspect.

FIG. 8 is a representational view illustrating an example host device 800 according to aspects herein. Host device 800 is an example of host device 110 used for implementing the techniques disclosed herein. Host device 800 includes a processor 801, which can include one or more processing devices. Examples of processor 801 include without limitation a microprocessor, an application-specific integrated circuit (ASIC), a state machine, or other suitable processing device. Processor 801 is communicatively coupled to a computer-readable storage medium, such as memory 804, and accesses information stored in memory 804, such as timestamps and chain of quality information. Memory 804 also stores computer-executable instructions that when executed by processor 801 cause the processor 801 to perform the operations described herein. Memory 804 may be, for example, solid-state memories, optical and magnetic media or any other non-transitory machine-readable medium. Non-limiting examples of memory 804 include a hard drive, compact disc, flash memory, non-volatile memory, volatile memory, magnetic disk(s), etc. Host device 800 also includes a transceiver 803 for including a wireless transmitter 803a and a wireless receiver 803b, clock 802 for generating timestamps, and antenna 850. The wireless transmitter 803a may be used to transmit data packets via the antenna 850, and the wireless receiver 803b may be used to receive incoming data via the antenna 805. As discussed above, clock 802 may be implemented by hardware or by software.

FIG. 8 is merely one example of a particular implementation and is merely to illustrate the types of components that may be present in a node. While the host device 800 is illustrated with various components, it is not intended to represent any particular architecture or manner of interconnecting the components; as such details are not germane to the aspects herein. It will also be appreciated that network computers, handheld computers, mobile phones, servers, and/or other data processing systems which have fewer components or perhaps more components may also be used with the aspects herein. Accordingly, the processes described herein are not limited to use with the hardware and software of FIG. 8.

Figure 9:
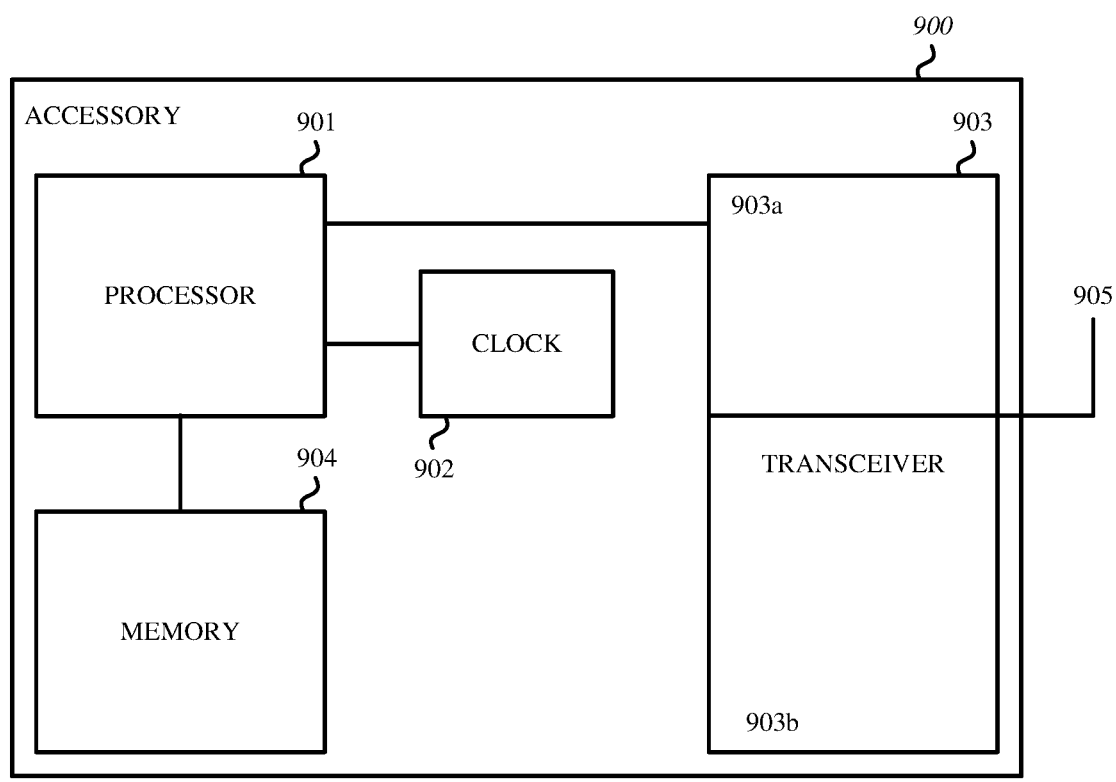
FIG. 9 illustrates a representational view of an accessory device according to an example aspect.

FIG. 9 is a representational view illustrating an example accessory device 900 according to aspects herein. Accessory device 900 is an example of first and second accessory devices 120, 130 used for implementing the techniques disclosed herein. Accessory device 900 includes a processor 901, which can include one or more processing devices. Examples of processor 901 include without limitation a microprocessor, an application-specific integrated circuit (ASIC), a state machine, or other suitable processing device. Processor 901 is communicatively coupled to a computer-readable storage medium, such as memory 904, and accesses information stored in memory 904, such as timestamps and chain of quality information. Memory 904 also stores computer-executable instructions that when executed by processor 901 cause the processor 901 to perform the operations described herein. Memory 904 may be, for example, solid-state memories, optical and magnetic media or any other non-transitory machine-readable medium. Non-limiting examples of memory 904 include a hard drive, compact disc, flash memory, non-volatile memory, volatile memory, magnetic disk(s), etc. Accessory device 900 also includes a transceiver 903 including a wireless transmitter 903a and a wireless receiver 903b, and clock 902 for generating timestamps. The wireless transmitter 903a may be used to transmit data packets via the antenna 950, and the wireless receiver 903b may be used to receive incoming data via the antenna 950. As discussed above, clock 902 may be implemented by hardware or by software.

FIG. 9 is merely one example of a particular implementation and is merely to illustrate the types of components that may be present in a node. While the accessory device 900 is illustrated with various components, it is not intended to represent any particular architecture or manner of interconnecting the components; as such details are not germane to the aspects herein. It will also be appreciated that network computers, handheld computers, mobile phones, servers, and/or other data processing systems which have fewer components or perhaps more components may also be used with the aspects herein. Accordingly, the processes described herein are not limited to use with the hardware and software of FIG. 9.

In another aspect of this disclosure, there is an accessory device comprising: a wireless transmitter; a wireless receiver; and a processor coupled to a memory configured to control the wireless transmitter and the wireless receiver; wherein the wireless receiver is configured to receive audio data packets transmitted from the host device via a broadcast channel; the processor is further configured to determine whether one of the radio packets has not been received; the wireless transmitter is configured to send a negative-acknowledgement signal (NACK) to the host device via a unicast channel based on the determination, the NACK indicating that at least one audio data packet has not been received by the accessory device; and the wireless receiver is further configured to receive the indicated at least one audio packet, the indicated at least one audio data packet being retransmitted from the host device via the broadcast channel.

Some portions of the preceding detailed descriptions have been presented in terms of algorithms. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio system may be performed by one or more programmable processors executing one or more computer programs stored on a non-transitory computer readable storage medium to perform the functions of the system. All or part of the audio system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

As described above, one aspect of the present technology could involve the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, TWITTER ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

While certain aspects have been described and shown in the accompanying drawings, it is to be understood that such aspects are merely illustrative of and not restrictive, and are not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method for a host device communicating with a plurality of accessory devices, the method comprising:
   transmitting audio data packets via a broadcast channel to the plurality of accessory devices, wherein the audio data packets comprise respective sequence numbers to indicate an order of transmission of the audio data packets;
   receiving a negative-acknowledgement signal (NACK) from at least one of the accessory devices via a unicast channel, the NACK indicating that the at least one of the accessory devices did not receive at least one audio data packet as indicated by the respective sequence number, and the NACK includes one or more conditions of an RF channel used to transmit the audio data packets; and
   retransmitting via the broadcast channel to the plurality of accessory devices the at least one audio data packet indicated as not being received, wherein the at least one audio data packet is transmitted with a lower bit rate based at least on the one or more conditions of the RF channel.

2. The method according to claim 1, wherein the host device operates in accordance with a Bluetooth specification.

3. The method according to claim 2, wherein the at least one audio data packet that is retransmitted is one of a plurality of retransmitted packets that have been delayed to increase likelihood of successful reception, in a fixed-number-of-retransmissions setup.

4. The method according to claim 1, wherein the at least one audio data packet that is retransmitted is one of a plurality of retransmitted packets that have been delayed to increase likelihood of successful reception, in a fixed-number-of-retransmissions setup.

5. The method of claim 4 wherein the at least one audio data packet that is retransmitted is one of a plurality of retransmitted packets that have been staggered.

6. The method according to claim 1, wherein a size of the audio data packets transmitted by the host device is varied based on the one or more conditions of the RF channel.

7. A host device comprising:
   a wireless transmitter;
   a wireless receiver; and
   a processor coupled to a memory and configured to control the wireless transmitter and the wireless receiver so that
   the wireless transmitter transmits audio data packets via a broadcast channel to a plurality of accessory devices, the audio data packets having respective sequence numbers to indicate an order of transmission of the audio data packets,
   the wireless receiver receives a negative-acknowledgement signal (NACK) from at least one of the accessory devices via a unicast channel, wherein the NACK indicates i) that the at least one of the accessory devices has not received at least one audio data packet having a respective sequence number and ii) one or more conditions of an RF channel used to transmit the audio data packets, and
   the wireless transmitter retransmits via the broadcast channel to the plurality of accessory devices the at least one audio data packet having the respective sequence number, wherein the hose device varies a size of at least the retransmitted audio data packet having the respective sequence number based on the one or more conditions of the RF channel.

8. The host device of claim 7 wherein the wireless transmitter is configured to retransmit the at least one audio data packet with a lower bit rate that is based on the one or more conditions of the RF channel.

9. The host device according to claim 7, wherein the host device operates in accordance with a Bluetooth specification.

10. The host device according to claim 7, wherein the at least one audio data packet that is retransmitted is one of a plurality of retransmitted packets that have been delayed at transmission to increase likelihood of successful reception.

11. The host device of claim 7 wherein the at least one audio data packet that is retransmitted is one of a plurality of retransmitted packets that have been staggered at transmission.

12. A method for an accessory device communicating with a host device, the method comprising:
   receiving audio data packets transmitted from the host device via a broadcast channel, wherein the audio data packets comprise respective sequence numbers to indicate an order of transmission of the audio data packets from the host device;
   determining that at least one audio data packet has not been received;
   sending a negative-acknowledgement signal (NACK) to the host device via a unicast channel based on the determination, the NACK comprising i) a sequence number that is associated with at least one audio data packet that has not been received by the accessory device and ii) one or more conditions of an RF channel used to transmit the audio data packets; and
   receiving the at least one audio data packet as a retransmitted audio data packet from the host device via the broadcast channel, wherein the retransmitted audio data packet is transmitted with a lower bit rate based at least on the one or more conditions of the RF channel.

13. The method according to claim 12, wherein determining whether one of the audio data packets has not been received comprises determining whether the audio data packets received are missing a sequence number.

14. The method according to claim 12, wherein the at least one audio data packet that is retransmitted is at least one of delayed or staggered.

\* \* \* \* \*